US010800227B2

(12) United States Patent
Sakai

(10) Patent No.: US 10,800,227 B2
(45) Date of Patent: Oct. 13, 2020

(54) AIR-CONDITIONING CONTROL APPARATUS

(71) Applicant: DENSO CORPORATION, Kariya, Aichi-pref. (JP)

(72) Inventor: Koji Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/675,032

(22) Filed: Nov. 5, 2019

(65) Prior Publication Data

US 2020/0062079 A1 Feb. 27, 2020

Related U.S. Application Data

(63) Continuation of application No. PCT/JP2018/017719, filed on May 8, 2018.

(30) Foreign Application Priority Data

Jun. 5, 2017 (JP) .................................. 2017-111018
Jan. 18, 2018 (JP) .................................. 2018-006224

(51) Int. Cl.
*B60H 1/00* (2006.01)

(52) U.S. Cl.
CPC ..... *B60H 1/00742* (2013.01); *B60H 1/00328* (2013.01); *B60H 1/00764* (2013.01)

(58) Field of Classification Search
CPC ............ B60H 1/00735; B60H 1/00742; B60H 1/00328; B60H 1/00764
See application file for complete search history.

(56) References Cited

U.S. PATENT DOCUMENTS 6,257,198 B1 * 7/2001 Harada ................. B60H 1/3208
123/295
9,682,609 B1 * 6/2017 Dudar ................. B60H 1/00764
(Continued)

FOREIGN PATENT DOCUMENTS

JP 20011787 A 1/2001
JP 2001063347 A 3/2001
(Continued)

OTHER PUBLICATIONS

U.S. Appl. No. 16/675,081, filed Nov. 5, 2019, Sakai et al.
U.S. Appl. No. 16/675,057, filed Nov. 5, 2019, Sakai et al.

*Primary Examiner* — Marc E Norman
*Assistant Examiner* — Schyler S Sanks
(74) *Attorney, Agent, or Firm* — Harness, Dickey & Pierce, P.L.C.

(57) ABSTRACT

An air-conditioning control apparatus is mounted in a vehicle that is capable of unmanned travelling. The apparatus has a determining section and an output section. The determining section determines whether an occupant is in the vehicle and whether the vehicle is traveling. The output section performs an air-conditioning control including temperature adjusting using a radiator through heat exchange with air outside the vehicle. The output section performs the air-conditioning control when the vehicle is in an unmanned state and a travelling state, and refrains from performing the air-conditioning control when the vehicle is in the unmanned state and a stop state.

11 Claims, 5 Drawing Sheets

(56) References Cited

U.S. PATENT DOCUMENTS

| | | | |
|---|---|---|---|
| 2001/0039230 A1* | 11/2001 | Severinsky | B60H 1/004 477/3 |
| 2006/0086113 A1* | 4/2006 | Errington | B60H 1/3208 62/181 |
| 2006/0241836 A1* | 10/2006 | Kachouh | B60H 1/00742 701/49 |
| 2008/0034767 A1* | 2/2008 | Ziehr | B60H 1/00385 62/180 |
| 2015/0183294 A1* | 7/2015 | Hamamoto | F25B 5/04 62/208 |
| 2016/0090055 A1 | 3/2016 | Breed | |
| 2018/0194361 A1* | 7/2018 | Dudar | B60H 1/00764 |

FOREIGN PATENT DOCUMENTS

| | | | |
|---|---|---|---|
| JP | 2002264635 A | | 9/2002 |
| JP | 200311657 A | | 1/2003 |
| JP | 2003011657 A | * | 1/2003 |

\* cited by examiner

US 10,800,227 B2

AIR-CONDITIONING CONTROL APPARATUS

CROSS REFERENCE TO RELATED APPLICATION

This application is a continuation application of international Patent Application No. PCT/JP2018/017719 filed on May 8, 2018, which designated the U.S. and claims the benefit of priority from Japanese Patent Application No. 2017-111018 filed on Jun. 5, 2017 and Japanese Patent Application No. 2018-006224 filed on Jan. 18, 2018, the disclosure of which is incorporated herein by reference.

TECHNICAL FIELD

The present disclosure relates to an air-conditioning control apparatus disposed in a vehicle capable of unmanned traveling.

BACKGROUND

A control apparatus controls a compressor to operate air-conditioning for an occupant during manned traveling, and controls the compressor to stop during unmanned traveling.

SUMMARY

An air-conditioning control apparatus in the present disclosure is mounted in a vehicle. The air-conditioning control apparatus has a processor. The processor has a determining section and an output section. The determining section of the processor is programmed to determine whether an occupant in the vehicle and whether the vehicle is traveling. The output section of the processor is programmed to perform air-conditioning control including temperature adjusting based on a determination result by the determining section. The output section is further programmed to perform the air-conditioning control when the determination result indicates the vehicle is in an unmanned state and a traveling state. The output section is further programmed to refrain from performing the air-conditioning control when the determination result indicates the vehicle is in the unmanned state and a stop state.

An air-conditioning system is for a vehicle that is capable of unmanned traveling has an air-conditioning device, a radiator fan, and a processor. The air-conditioning device performs air-conditioning in a vehicle cabin using a radiator that performs heat exchange with an air outside of the vehicle. The radiator fan is configured to cool the radiator by drawing the air outside of the vehicle. The processor is programmed to determine whether an occupant is in the vehicle and whether the vehicle is traveling. The processor is further programmed to control the air-conditioning device to perform the air-conditioning while stopping the radiator fan upon determining that an occupant is not in the vehicle and the vehicle is traveling, and to control the air-conditioning device not to perform the air-conditioning upon determining that an occupant is not in the vehicle and the vehicle is not traveling.

DETAILED DESCRIPTION

Figure 1:
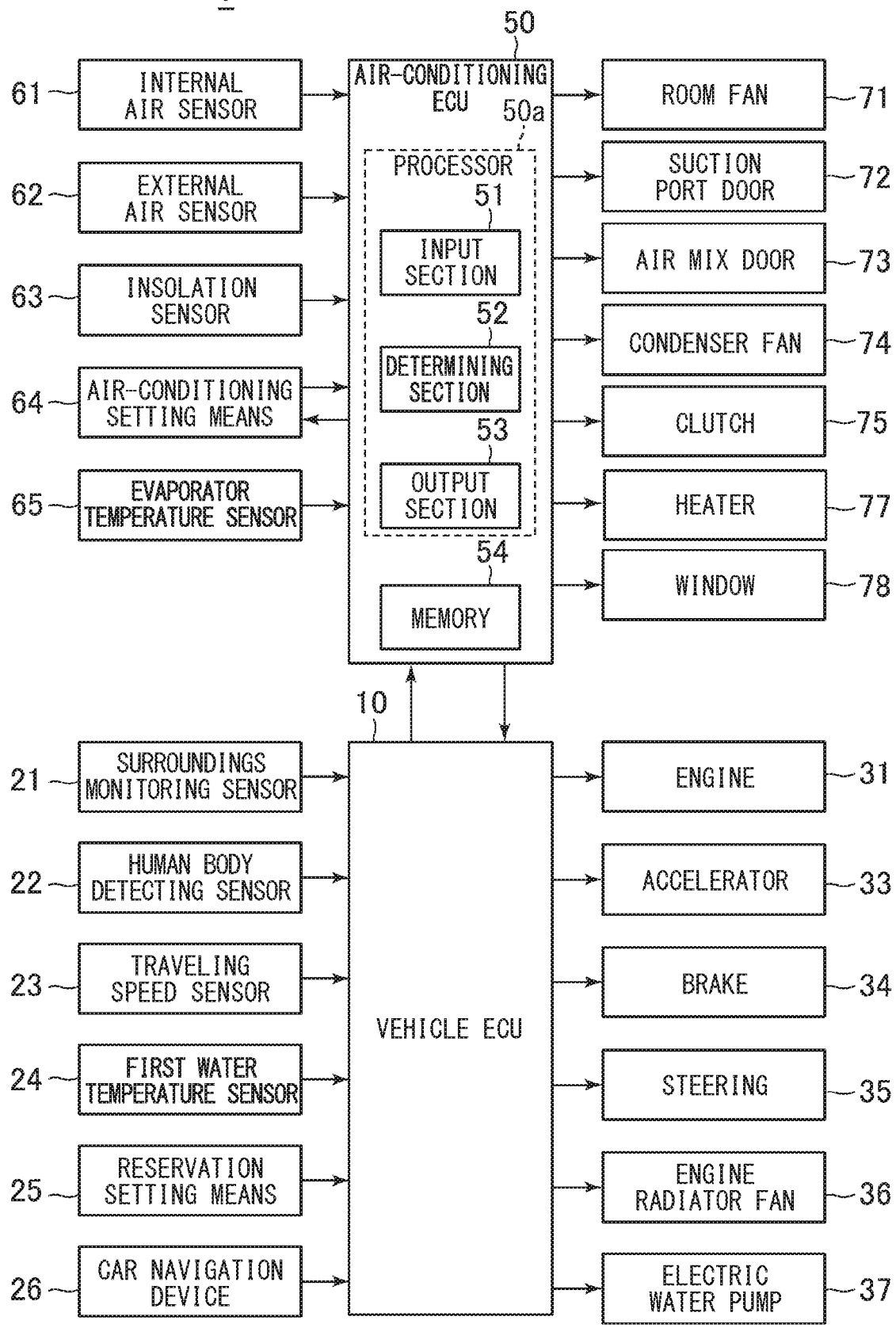
FIG. 1 is a block diagram of an air-conditioning device for a vehicle.

To begin with, examples of relevant techniques will be described.

The present disclosure relates to an air-conditioning control apparatus disposed in a vehicle capable of unmanned traveling.

Such a control apparatus controls a compressor to operate air-conditioning for an occupant during manned traveling, and controls the compressor to stop during unmanned traveling. For vehicles capable of the unmanned traveling, there has been a demand to improve fuel efficiency by efficiently conducting air-conditioning, e.g., by refraining from conducting unnecessary air-conditioning.

A compressor for air-conditioning is controlled to stop air-conditioning when a vehicle is determined to be unmanned traveling. A lot of time and energy is consumed to complete air-conditioning for a cabin of the vehicle so as to provide a comfortable cabin for an occupant who just gets on the vehicle after the unmanned traveling. When the air-conditioning keeps being performed during the unmanned traveling, a lot of energy is consumed for the air-conditioning. According to an aspect described above and other aspects that are not described above, further improvements are needed for air-conditioning devices for a vehicle.

In the present disclosure, an air-conditioning control apparatus to perform beforehand proper air-conditioning during unmanned traveling is provided. According to the present disclosure, the air-conditioning is performed when the vehicle is in the unmanned state and the traveling state, and the air-conditioning is not performed when the vehicle is in the stop state. This enables a heat generating device to be cooled by a traveling air, thereby providing efficient air-conditioning.

Hereinafter, embodiments will be described with reference to the drawings. Same or equivalent portions among respective embodiments below are labeled with the same reference numerals in the drawings as well as possible and duplicated explanations are omitted for easy understandings.

First Embodiment

An air-conditioning device 1 for a vehicle is mounted in the vehicle. The air-conditioning device 1 for the vehicle provides air-cooling, air-heating, and/or ventilation in a cabin of the vehicle. The air-conditioning device 1 performs air-cooling and air-heating by conveying temperature conditioned air to the cabin. The air-conditioning device 1 ventilates the cabin by discharging air from the cabin and taking outside air into the cabin.

The vehicle is controlled by a vehicle control apparatus 10 (herein after referred to vehicle ECU). In other words, the vehicle ECU 10 controls a traveling of the vehicle and a cooling system needed for the traveling.

In FIG. 1, the vehicle ECU 10 connects a surroundings monitoring sensor 21, a human body detecting sensor 22, a traveling speed sensor 23, a first water temperature sensor 24, a reservation setting means 25, and a car navigation device 26. The vehicle ECU 10 inputs a signal detected in each of the above mentioned connecting members.

The surroundings monitoring sensor 21 is a sensor to acquire data of surroundings of the vehicle in an external environment. The surroundings monitoring sensor 21 is a camera disposed to face forward in a traveling direction of the vehicle. The surroundings monitoring sensor 21 may be a radar to detect an obstacle in front of the vehicle. The surroundings monitoring sensor 21 may be formed of both a camera and a radar. The vehicle ECU 10 acquires data necessary for controlling the unmanned traveling, such as data of the surroundings of the vehicle in the external environment, using the surroundings monitoring sensor 21.

The human body detecting sensor 22 is a judgement means to detect whether an occupant is in the vehicle or not. The human body detecting sensor 22 is a seat sensor disposed in a seat and detecting whether an occupant is in the vehicle by a load from the occupant on the seat. The seat sensor is disposed in each of a plurality of seats in the cabin and detects the seat on which the occupant is seated. The human body detecting sensor 22 is not necessarily limited to the seat sensor. The human body detecting sensor 22 may be a seat belt sensor that detects whether the occupant wears a seat belt. The human body detecting sensor 22 may be an infrared sensor that detects an infrared rays emitted from a human body. The infrared sensor can detect whether an occupant is in the cabin even when the occupant is not seated. The vehicle ECU 10 acquires signal from the human body detecting sensor 22 and sends the signal to an air-conditioning control apparatus 50 described later. The air-conditioning control apparatus 50 performs an air-conditioning control based on the information from the vehicle ECU 10.

The traveling speed sensor 23 is a sensor to detect a traveling speed of the vehicle. The traveling speed sensor 23 is disposed at a wheel and detects a rotational speed of the wheel. Then, a traveling speed of the vehicle is calculated.

The first water temperature sensor 24 is a temperature sensor disposed in a circulation passage of cooling water for an engine 31. The first water temperature sensor 24 is located at a vicinity of an exit of the engine 31. The first water temperature sensor 24 detects an increased temperature of the cooling water just having exchanged heat with the engine 31.

The reservation setting means 25 is an operation means by which a user makes a reservation for the vehicle. The vehicle ECU 10 controls the vehicle to travel automatically to a designated place at a designated time that are reserved in advance by the reservation setting means 25. The reservation setting means 25 is a communication device outside the cabin, such as a smartphone and a computer. The reservation setting means 25 may be an operation terminal disposed in the cabin. In this case, an occupant in the cabin inputs information, such as next scheduled pickup time and next scheduled pickup location, to make a reservation. The reservation setting means 25 can also set a target temperature in the cabin and information to play or not to play music in the cabin.

The car navigation device 26 determines an optimized traveling route and calculates an expected time to get to a destination using destination information and current location information acquired by GPS. The expected time to the destination is calculated by dividing distance value by speed value, such as 40 km/h. The distance value is calculated by multiplying a liner distance between the current location and the destination by a bypass coefficient. The traffic congestion information may be acquired to calculate the expected time. The expected time may be revised to be longer when traffic congestion occurs.

The vehicle ECU 10 is connected to the engine 31, an accelerator 33, a brake 34, and a steering 35, which are traveling devices necessary for the traveling. The vehicle ECU 10 is also connected to an engine radiator fan 36 and an electric water pump 37, which are cooling devices to cool the traveling devices. The vehicle ECU 10 outputs a signal to control each of the traveling devices and the cooling devices.

The engine 31 is a driving force for the vehicle. The engine 31 is an internal combustion engine to obtain the driving force from combustion gas generated by fuel combustion. The driving force generated by the engine 31 is also used for driving a compressor that compresses a refrigerant and circulates the compressed refrigerant through a cooling heat exchanger in the air-conditioning device.

The accelerator 33 is a device to accelerate the vehicle. The brake 34 is a device to decelerate the vehicle. The vehicle ECU 10 controls the vehicle speed by controlling the accelerator 33 and the brake 34, which accelerates and decelerates the vehicle respectively.

The steering 35 is a device to control wheels to point in a desired direction. The vehicle ECU 10 controls the traveling direction of the vehicle by controlling the steering 35.

The engine radiator fan 36 is a blower to blow air to an engine radiator. The engine radiator is a radiator where the cooling water for the engine circulates. The engine radiator fan 36 is disposed in front of the engine radiator disposed in a front side of the vehicle. In other words, the engine radiator fan 36 is disposed to face the engine radiator. The engine radiator fan 36 blows air from the front side to a rear side of the vehicle. In other words, the engine radiator fan 36 blows air in the same direction as a traveling air that the vehicle receives while traveling.

The vehicle ECU 10 is connected to the electric water pump 37. The electric water pump 37 is driven to generate a driving force to circulate cooling water that cools the engine 31 for the vehicle. The vehicle ECU 10 controls the electric water pump 37 in pumping output as well as on-off of the electric water pump 37.

The vehicle ECU 10 also controls devices used for traveling the vehicle, such as a transmission, head lights, indicators, and wipers. The vehicle ECU 10 is connected to the air-conditioning control apparatus 50 (hereinafter referred to air-conditioning ECU) and us communicable with the apparatus 50. The air-conditioning ECU 50 performs control for air-conditioning.

The air-conditioning ECU 50 has a processor 50a and a memory 54. The processor 50a includes, as functional blocks, an input section 51, a determining section 52, and an output section 53. The input section 51 of the processor 50a is programmed to input a signal outputted from the vehicle ECU 10 and a sensor connected to the air-conditioning ECU. The determining section 52 of the processor 50a is programmed to perform calculation based on the information inputted in the input section 51 and determines conditions of the air-conditioning control. The output section 53 of the processor 50a is programmed to output the conditions of the air-conditioning control determined by the determining section 52 to connected devices that are control targets. The memory 54 stores the information inputted to the input section 51 and the determination result determined by the determining section 52.

The air-conditioning ECU 50 connects an internal air sensor 61, an external air sensor 62, an insolation sensor 63, an air-conditioning setting means 64, and an evaporator temperature sensor 65. The air-conditioning ECU 50 inputs signals detected by the connecting members.

The internal air sensor 61 is a temperature sensor that measures a temperature in the cabin. The internal air sensor 61 is disposed in an instrument panel in the cabin. The external air sensor 62 is a temperature sensor that measures a temperature outside the cabin. The external air sensor 62 is disposed at a back side of a front bumper, which is less likely to be affected by heat from an engine room. The insolation sensor 63 is a sensor that measures an intensity of an insolation to the vehicle. The insolation sensor 63 is disposed on an upper surface of a dashboard.

The air-conditioning setting means 64 is an operation panel that enables an occupant to set a target temperature in the cabin and an intensity of air blown from the air-conditioning device. The air-conditioning setting means 64 is disposed in the cabin. The occupant can operate the air-conditioning setting means 64 during traveling. The air-conditioning setting means 64 is not necessarily limited to the operation panel disposed in the cabin. The air-conditioning setting means 64 may be a communicating device outside the cabin, such as a smartphone and a computer. The air-conditioning setting means 64 may be the same device as the reservation setting means 25, which enable the air-conditioning setting and the reservation setting possible through a single device.

The air-conditioning ECU 50 calculates a target air outlet temperature based on measurement results from the internal air sensor 61, the external air sensor 62, and the insolation sensor 63, and on information from the air-conditioning setting means 64 including the target temperature in the cabin. The target air outlet temperature is a target temperature around an air outlet of conditioned air. The air-conditioning ECU 50 performs the air-conditioning based on the target air outlet temperature.

The evaporator temperature sensor 65 is a temperature sensor to measure a temperature of an evaporator that is a cooling heat exchanger. The evaporator temperature sensor 65 is disposed at a vicinity of an output pipe of the evaporator. The air-conditioning ECU 50 controls the air-cooling based on the evaporator temperature measured by the evaporator temperature sensor 65.

The air-conditioning ECU 50 is connected to a room fan 71, a suction port door 72, an air mix door 73, a condenser fan 74, a clutch 75, a heater 77, and a window 78. The air-conditioning ECU 50 outputs the signal to control the connected parts described above.

The room fan 71 is a fan conveying a conditioned air into the cabin. The room fan 71 conveys air to the evaporator that is the cooling heat exchanger and to a heater core that is a heating heat exchanger. The air having exchanged heat with both the evaporator and the heater core is blown from the outlet to the cabin as a conditioned air. The air-conditioning ECU 50 controls the room fan 71 and conveys the conditioned air to the cabin to control the air-conditioning.

The suction port door 72 is a door that selectively closes either one of an internal suction port or an external suction port. The suction port door 72 is a rotary door that controls an opening degree by rotating about a rotation axis. When the external suction port is closed, the conditioned air is circulated in the cabin. A mode where the conditioned air is recirculated in the cabin is an inside air mode. When the internal suction port is closed, air taken outside the cabin is conveyed to the cabin. A mode where outside air is taken into the cabin is an outside air mode.

The air mix door 73 is a door to control heat exchange between the air having passed the evaporator, which is the cooling heat exchanger, and a heater core, which is the heating heat exchanger. The air mix door 73 is disposed in front of the heater core. The air mix door 73 is a plate door. When the air mix door 73 is closed to entirely cover the front side of the heater core, cooled, conditioned air having exchanged heat only with the evaporator is conveyed to the cabin. When the air mix door 73 is opened and distanced away from the front side of the heater core, conditioned air having exchanged heat with both the evaporator and the heater core is conveyed to the cabin.

The condenser fan 74 is a blower to convey air to the condenser that is a radiator constituting a part of a refrigerating cycle system for air-cooling. The condenser fan 74 is disposed in front of the condenser disposed in a front side of the vehicle. The condenser fan 74 conveys air from the front side to the rear side of the vehicle. In other words, the condenser fan 74 is disposed to face the condenser and conveys air in the same direction as the traveling air that the vehicle receives while traveling. The condenser fan 74 is adjacent to the engine radiator fan 36.

The clutch 75 is a connecting device to control a connection between the engine 31 and the compressor constituting the refrigerating cycle. The clutch 75 is a magnet clutch controlling a connecting state and a releasing state by magnetic force. The clutch 75 is in the connecting state during the air-cooling. That is, the compressor is connected to the engine 31 and driven by the engine 31. In other words, the compressor is an air-conditioning device that performs the air-conditioning using a driving force from the engine 31 which drives the vehicle. When the vehicle performs the air-cooling during stop, the engine 31 should be driven to drive the compressor. When the vehicle does not perform air-cooling, the clutch 75 is in the releasing state. To say, the compressor is released from the engine 31 and stopped to be driven.

The heater 77 is a heater to heat the cabin. The heater 77 is a PTC heater having electric resistance changes with a positive coefficient in proportion to a rise in temperature. The heater 77 is disposed additionally to the heater core and contributes to air-heating in the cabin. The air-conditioning ECU 50 energizes the heater 77 to increase the temperature when air-heating is needed. The heater 77 may be a seat heater disposed at the seat as long as the heater 77 contributes the air-heating.

The window 78 has a ventilation function to intake an external air into the cabin. The window 78 is disposed at an upper part of a door through which the occupant gets on and off the vehicle. The air-conditioning ECU 50 opens the window 78 to discharge the air in the cabin outside and to intake an external air into the cabin for ventilation. The air-conditioning ECU 50 closes the window 78 after the ventilation is completed.

The air-conditioning ECU 50 controls the devices to convey the conditioned air at the target air outlet temperature. The air-conditioning ECU 50 controls a rotational speed of the room fan 71. The air-conditioning ECU 50 controls switching of the suction port door 72. The air-conditioning ECU 50 controls the opening degree of the air mix door 73. The air-conditioning ECU 50 controls a rotational speed of the condenser fan 74. The air-conditioning ECU 50 controls switching between the connecting and releasing state of the clutch 75. The air-conditioning ECU 50 controls an output amount of the heater 77. The air-conditioning ECU 50 controls an opening degree of the window 78.

Figure 2:
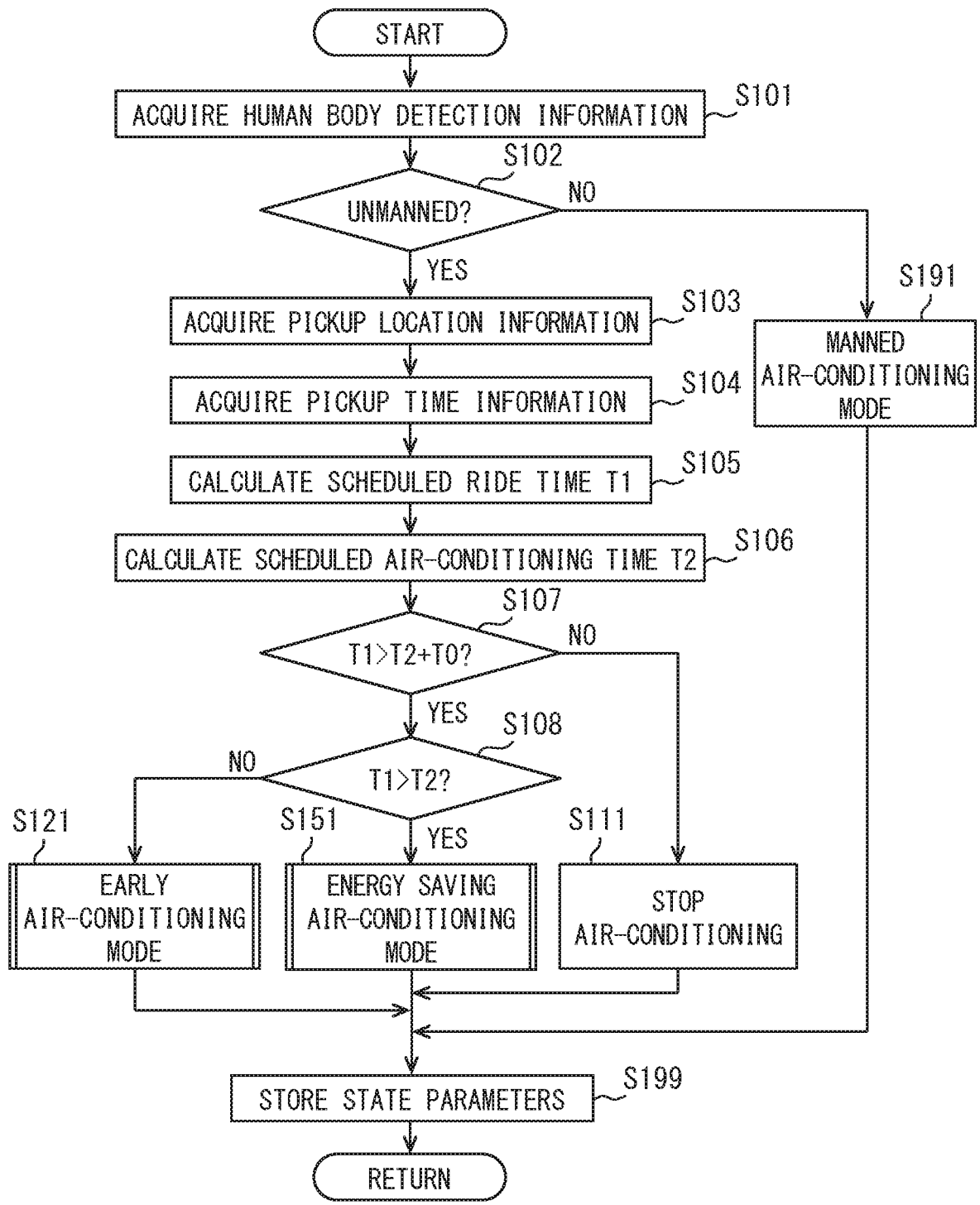
FIG. 2 is a flowchart in controlling the air-conditioning device for the vehicle.

A control process by the air-conditioning device 1 is explained with reference to FIG. 2. When the air-conditioning device 1 starts the control process, the human body detecting sensor 22 detects an occupant at step S101. After the human body detecting sensor 22 detects the presence of an occupant, the determining section 52 (i.e., the processor 50*a*) determines whether an occupant is in the cabin at a step S102. When the determining section 52 determines that an occupant is not in the cabin, the control process proceeds to step S103. When the determining section determines that an occupant is in the cabin, the control process proceeds to step S191.

At step S191, the air-conditioning is controlled in a manned air-conditioning mode. In the manned air-conditioning mode, the air-conditioning is performed so that the occupant in the vehicle feels comfortable. In other words, in the manned air-conditioning mode, the air-conditioning is performed considering other comfortable factors such as a noise as well as a temperature. More specifically, intensity of the drive of the room fan 71 in the manned air-conditioning mode is lowered than that in the unmanned state. In other words, a maximum limit of the rotational speed of the room fan 71 is lowered than that in the unmanned state. The seat heater is used only during the manned air-conditioning mode. The seat heater is not energized during the unmanned state, and is energized only after an occupant is seated. After the air-conditioning in the manned air-conditioning mode, the control process proceeds to step S199 while keeping the air-conditioning.

At step S103, pickup location information set by the reservation setting means 25 is acquired. The pickup location information is scheduled pickup information indicating a location where an occupant gets on the vehicle. The pickup location information may be an address where a user gets on the vehicle. The user may input the exact address or search the address by inputting a name of a building and/or a place. In addition, the pickup location information may be a fixed pickup location and the user gets on the vehicle at the fixed pickup location. In this case, the pickup location information is not inputted by the user, but acquired by reading the fixed pickup location information that is set in advance. After acquiring the pickup location information, the control process proceeds to step S104.

At step S104, pickup time information inputted by the user is acquired through the reservation setting means 25. The pickup time information is the scheduled pickup information indicating a time an occupant gets on the vehicle. For example, the pickup time information is a time such as "7:30 p.m." The user may input a time directly or input passage of time from the present time, such as "in thirty minutes". In addition, the user may input the present time instead of inputting a future time. The user who wants to get on the vehicle as soon as possible may input a present time. In this case, the present time or the past time is acquired as the pickup time information. After acquiring the pickup time information, the control process proceeds to step S105.

The vehicle ECU 10 starts to control traveling based on the pickup location information and the pickup time information. To say, the vehicle ECU 10 controls traveling to get to the pickup location by the pickup time. For example, the present time is 7 p.m., the pickup time information is 7:30 p.m., and the pickup location information is a place in 15 minutes from the present location. In this case, the vehicle waits at the current location until 7:15 p.m. The vehicle starts to travel to the pickup location at 7:15 p.m. Traveling may be controlled so that the vehicle gets to the pickup location slightly before the pickup time. In the case that the present time is set as the pickup time information, or the vehicle cannot get to the pickup location by the pickup time, the traveling is controlled to get to the pickup location as soon as possible.

At step S105, scheduled ride time T1 is calculated. The scheduled ride time T1 is either longer one of a required time to travel from the present location to the pickup location or a time difference between the present time and the pickup time. The required time to travel from the present location to the pickup location is acquired from the car navigation device 26. For example, when the required time from the present location to the pickup location is 15 minutes and the time difference between the present time and the pickup time is one hour, the scheduled ride time T1 is 1 hour. The required time to travel from the present location to the pickup location may be acquired by calculation by the vehicle ECU 10 instead of using the car navigation device 26. The vehicle may have a communication device that acquires the required time that is calculated outside the vehicle. After the calculation of the scheduled ride time T1, the control process proceeds to step S106.

At step S106, a scheduled air-conditioning time T2 is calculated. The scheduled air-conditioning time T2 is a required time to complete the air-conditioning. The scheduled air-conditioning time T2 is decided by a characteristic map stored in the air-conditioning ECU 50 using a temperature difference between the present temperature in the cabin measured by the internal air sensor 61, and a target temperature. The target temperature is a temperature in the cabin inputted by the user through the reservation setting means 25. The target temperature is, for example, 20° C. The scheduled air-conditioning time T2 may not be decided by the characteristic map, but calculated by a function stored in the air-conditioning ECU 50 using the temperature difference between the temperature in the cabin and the target temperature. The scheduled air-conditioning time T2 may be a fixed sufficient time to reach the target temperature in advance instead of a calculated time from the target temperature. In this case, the scheduled air-conditioning time T2 is a fixed time such as 30 minutes. After the calculation of the scheduled air-conditioning time T2, the control process proceeds to step S107.

At step 107, the determining section 52 (the processor 50*a*) determines whether the scheduled ride time T1 is less than the total time of the scheduled air-conditioning time T2 and a buffer time T0. When the scheduled ride time T1 is less than the total time of the scheduled air-conditioning time T2 and the buffer time T0, the control process proceeds to step S108. On the other hand, when the scheduled ride time T1 is longer than the total time of the scheduled air-conditioning time T2 and the buffer time T0, the control process proceeds to step S111. The buffer time T0 is a time to complete the air-conditioning in advance of the scheduled ride time T1. The buffer time T0 is, for example, 10 minutes. When the scheduled air-conditioning time T2 is calculated as, for example, 20 minutes, the total time of the scheduled air-conditioning time T2 and the buffer time T0 is 30 minutes. When the scheduled ride time T1 is less than 30 minutes, the control process proceeds to step S108. When the scheduled ride time T1 is more than 30 minutes, the control process proceeds to step S111. The buffer time T0 may not be fixed. To say, the buffer time T0 may be calculated as a half time of the scheduled air-conditioning time T2.

At step S111, the air-conditioning is not performed. In other words, the air-conditioning keeps stopping if the air-conditioning has not been performed. When the air-conditioning has already started at step S111, the air-conditioning is stopped. In an air-conditioning stop state, the room fan 71 and the condenser fan 74 are also stopped, the connection of the clutch 75 is released, and energizing to the heater 77 is stopped. In other words, energy consumption of all devices used for the air-conditioning is reduced. However, the energy consumption may not be necessarily reduced in all devices used for the air-conditioning in the air-conditioning stop state. For example, only the connection of the clutch 75 may be released, which makes great effect on reduction in the energy consumption. Or, to prepare the air-cooling by the refrigerating cycle, only the room fan 71 may be stopped while the clutch 75 is kept connected and the condenser fan 74 is kept rotated. After the stop of the air-conditioning, the control process proceeds to step S100 while stopping the air-conditioning.

At step S108, the processor 50*a* determines whether the scheduled ride time T1 is longer than the scheduled air-conditioning time T2. When the scheduled ride time T1 is longer than the scheduled air-conditioning time T2, the control process proceeds to step S151. When the scheduled ride time T1 is less than the scheduled air-conditioning time T2, the control process proceeds to step S121.

At step S121, the air-conditioning is performed in an early air-conditioning mode. The early air-conditioning mode allows advance air-conditioning before manned travelling. The early conditioning mode is a mode where the air-conditioning is completed for a shorter time than the scheduled air-conditioning time T2. In the early air-conditioning mode, the air-conditioning is performed in the inside air mode, where air is taken from the internal suction port. The rotational speed of the room fan 71 in the early air-conditioning mode is set to be higher than that in an energy saving air-conditioning mode described later. In addition, the devices used for the air-conditioning such as the room fan 71 are continuously performed without stopping. Operating hours for the devices used for the air-conditioning such as the room fan 71 are set to be longer in the early air-conditioning mode than in the energy saving air-conditioning mode.

The control conditions in the early air-conditioning mode are not necessarily limited to the above-mentioned methods. For example, in the air-conditioning device including a plurality of the room fans 71, a number of the room fans 71 under operation may be increased in the early air-conditioning mode than in the energy saving mode. The rotational speed of the condenser fan 74 may be set to be higher than in the energy saving air-conditioning mode and the rotational speed of the engine 31 may be increased to get higher rotational speed of the compressor than in the energy saving air-conditioning mode. The output of the heater 77 may be set greater in the early air-conditioning mode than in the energy saving air-conditioning mode. After the air-conditioning in the early air-conditioning mode, the control process proceeds to step S199 while keeping the air-conditioning.

At step S151, the advance air-conditioning is performed in the energy saving air-conditioning mode, which will be described later, before the manned travelling. After the air-conditioning in the energy saving air-conditioning mode, the control process proceeds to step S199 while keeping the air-conditioning.

At step S199, the memory 54 of the air-conditioning ECU 50 stores state parameters related to the air-conditioning control. The state parameters include human body detection information, the pickup location information, the pickup time information, the scheduled ride time T1, the scheduled air-conditioning time T2, the air-conditioning mode under operation, the traveling speed, the rotational speed of the engine 31, the temperature of the cooling water for the engine, and the external temperature. The air-conditioning ECU 50 maintains the air-conditioning based on the state parameters stored at step S199. The control process is back to step S101 and repeats the flow of the air-conditioning control. When a new state parameter is acquired in steps such as step S101 in the second and subsequent flow, the air-conditioning is controlled with the newest state parameters in place of the state parameters that have already been stored. The stored state parameters is shared with the vehicle ECU 10 and used for controls such as the travelling control as well as the air-conditioning control.

Figure 3:
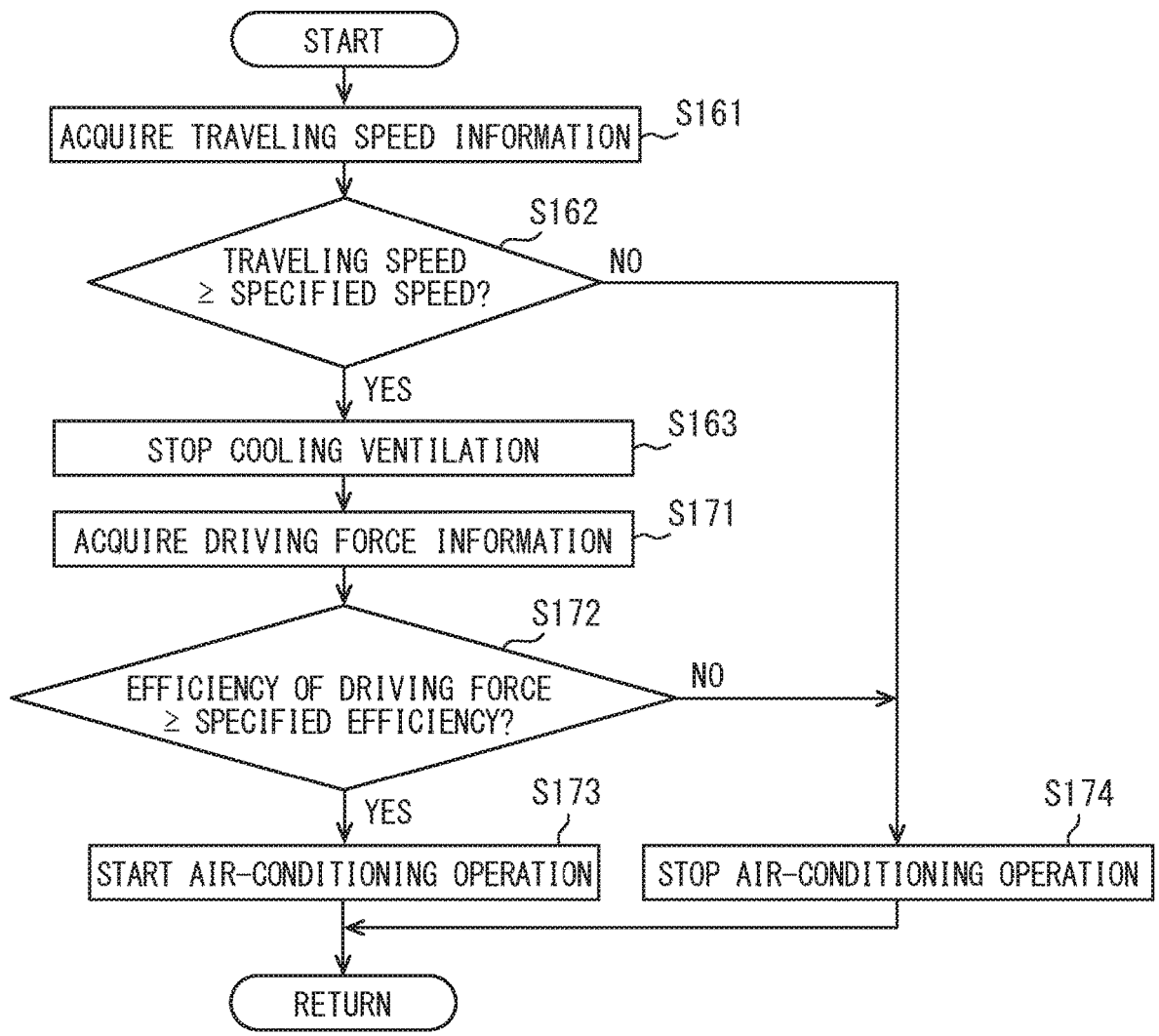
FIG. 3 is a flowchart of step S151 in the flowchart in FIG. 2.

The control process of the air-conditioning device 1 in the energy saving air-conditioning mode at step S151 is explained with reference to FIG. 3. When the air-conditioning in the energy saving air-conditioning mode is started, the processor 50*a* in the air-conditioning ECU 50 acquires traveling speed information at step S161. The traveling speed information is measured at the traveling speed sensor 23. The processor 50*a* determines whether the acquired traveling speed is greater than a specified speed at step S162. When the processor 50*a* determines that the acquired traveling speed is equal to or greater than the specified speed, the control process proceeds to step S163. When the processor 50*a* determines that the traveling speed is less than the specified speed, the control process proceeds to step S174. When the vehicle is stopped, the traveling speed is zero, which means that the vehicle speed is less than the specified speed.

At step S163, cooling ventilation is stopped. In other words, the engine radiator fan 36 and the condenser fan 74 are stopped. This means that the engine radiator and the condenser are cooled only by the traveling air during traveling. The cooling ventilation may not be stopped completely at step S163. The rotational speed of the engine radiator fan 36 and the condenser fan 74 may be slowed down to reduce the energy consumption of the fans. After stopping the fans, the control process proceeds to step S171.

At step S171, the processor 50*a* in the air-conditioning ECU 50 acquires the rotational speed of the engine 31 as the driving force information. The rotational speed of the engine 31 is measured by detecting electrically voltage applied to an ignition coil. The engine 31 at a low rotational speed has a large cooling loss, and thus has also a low efficiency. The engine 31 at a high rotational speed of the engine 31 has a large mechanical loss, and thus has also a low efficiency. The engine 31 at a medium rotational speed has well-balanced cooling loss and mechanical loss, and therefore has a best efficiency.

The processor 50*a* in the air-conditioning ECU 50 may acquire the temperature of the engine 31 as the driving force information. The temperature of the engine 31 is measured by measuring a temperature of the cooling water for the engine by the first water temperature sensor 24. When the temperature of the cooling water is low, the air-heating is not completed and the combustion efficiency of the gasoline is low. This means the efficiency of the engine 31 is also low. When the temperature of the cooling water is high, the air-heating is completed and the combustion efficiency of the gasoline is high. This means that the efficiency of the engine 31 is high. After the driving force information is acquired, the control process proceeds to step S172.

At step S172, the processor 50*a* determines whether an efficiency of the driving force is equal or higher than a specified efficiency. When the processor 50*a* determines the efficiency of the driving force based on the rotational speed of the engine 31, the processor 50*a* determines whether the rotational speed of the engine 31 falls within a specified range. When the rotational speed of the engine 31 falls within the specified range, the processor 50*a* determines that the efficiency of the driving force is equal or higher than the specified efficiency. The specified range is a range of the rotational speed including the medium rotational speed, or the most efficient rotational speed with plus/minus 500 rpm error. The most efficient rotational speed is a rotational speed when a ratio of an output energy as the driving force to an input energy in the engine 31 is the highest. When the most efficient rotational speed is 2000 rpm, the specified range may be set as a range from 500 rpm to 2500 rpm inclusive. The specified range is not limited to the range described above while the specified range includes the most efficient rotational speed.

When the processor 50*a* determines the efficiency of the driving force based on the temperature of the engine 31, the processor 50*a* determines whether the temperature of the cooling water for the engine is equal to or higher than a specified temperature. When the temperature of the cooling water is equal to or higher than the specified temperature, the processor 50*a* determines that the efficiency of the engine 31 is equal to or higher than the specified efficiency. The specified temperature may be the heating completed temperature, for example, 80° C. The heating completed temperature is a temperature when the heating is seemed to be completed. The processor 50*a* may determine that the efficiency of the driving force is equal to or higher than the specified efficiency at a temperature slightly lower than the heating completed temperature. When the efficiency of the driving force is equal to or higher than the specified efficiency, the control process proceeds to step S173. When the efficiency of the driving force is lower than the specified efficiency, the control process proceeds to step S174.

At step S173, the air-conditioning is started. The energy consumption for the air-conditioning is reduced by reducing the driving time of the room fan 71 in the energy saving air-conditioning mode than in the manned air-conditioning mode. More specifically, the room fan 71 is driven at higher rotational speed in the energy saving air-conditioning mode than in the manned air-conditioning mode, so that a large amount of conditioned air is blown into the cabin at once.

In the energy saving air-conditioning mode, the air-conditioning is performed in the inside air mode where air is taken from the internal suction port. The clutch 75 is connected to drive the compressor. The heater 77 is energized. The air is conditioned to the target temperature by controlling the opening degree of the air mix door 73 appropriately and mixing the cool air and the warm air. When the target temperature is low, the air-cooling may be performed by the refrigerating cycle system driven by the compressor and blowing air without energizing the heater 77. When the target temperature is high, the air-heating may be performed by energizing the heater 77 and blowing the air without driving the compressor. With keeping the air-conditioning, the control process returns back to the start of the energy saving air-conditioning mode and repeated the series of the air-conditioning control.

At step S174, the air-conditioning is stopped temporarily. In the air-conditioning stop state, the room fan 71 is stopped, the connection of the clutch 75 is released, and the energization of the heater 77 is stopped. In other words, the air-conditioning stop state is a state where the energy consumption of all devices used for the air-conditioning is reduced. The energy consumption may be reduced in a specified device, not in all of the devices used for the air-conditioning.

In the embodiment described above, the air-conditioning is performed in the unmanned traveling before the manned traveling and the air-conditioning is not performed while the vehicle is stopped without an occupant. The traveling air of the vehicle cools the radiator such as the condenser to reduce the energy consumption for driving the engine radiator fan 36 and the condenser fan 74. The vehicle does not use a driving force for the vehicle when performing the air-conditioning during stopping, which results in reducing the energy consumption. In other words, the engine 31 is not driven just only for the air-conditioning, which allows a reduction in the energy consumption.

When the traveling speed of the vehicle is equal to or greater than the specified speed, the processor 50*a* performs the air-conditioning including temperature adjusting. This means that the air-conditioning including temperature adjusting, which consumes large amount of energy, is performed when the vehicle receives a lot of traveling air. Thus, the energy consumption for driving the engine radiator fan 36 and the condenser fan 74 is reduced to achieve the efficient air-conditioning. The engine 31 is not driven for the air-conditioning while the vehicle is stopped or travels at a low speed, which reduces the energy consumption.

When the efficiency of the driving force of the vehicle is equal to or higher than the specified efficiency, the processor 50*a* performs the air-conditioning including temperature adjusting. The driving force for the air-conditioning is acquired from the engine 31 when the engine 31 that is a driving force for the vehicle has high efficiency. The energy consumption for the air-conditioning is reduced to get the efficient air-conditioning.

The vehicle in the manned air-conditioning mode performs the air-conditioning considering the comfort element such as the noise as well as the temperature. This allows reducing the noise of the room fan 71 and improving the comfort in the cabin.

The seat heater is used only during the manned air-conditioning mode. The heating device, such as the seat heater, that gives a large effect when an occupant is sated is not used during the unmanned state. This allows reducing excess energy consumption for the air-heating and getting efficient air-heating.

The rotational speed of the room fan 71 in the energy saving air-conditioning mode and the early air-conditioning mode is higher than in the manned air-conditioning mode. This increases the amount of the air in the cabin in the unmanned state during which silence is not needed, and allows a temperature in the cabin to reach the target temperature immediately. The total time required for the air-conditioning is reduced, so that the energy consumption for the air-conditioning can be reduced.

The air-conditioning device 1 for the vehicle performs the air-conditioning in the unmanned state based on the scheduled pickup information. The scheduled pickup information indicates a location where an occupant intends to get on the vehicle. The advance air-conditioning is performed when the air-conditioning is needed. This allows the reduction of the energy consumption as compared to a case where the air-conditioning is kept being performed all the time. The advance air-conditioning is performed in advance before an occupant gets on the vehicle, thus the cabin is conditioned to be comfortable by the time the occupant gets on the vehicle. When the scheduled ride time T1 is delayed because of an accident such as traffic congestion, unnecessary air-conditioning is stopped and the air-conditioning is started at a proper timing for the start of the air-conditioning.

The scheduled ride time T1 as the scheduled pickup information is calculated based on the pickup location information and the present location. The start of the advanced air-conditioning is determined by comparing the scheduled ride time T1 and the scheduled air-conditioning time T2. This allows the advanced air-conditioning to be started at the proper timing before the vehicle arrives at the pickup location. This reduces the energy consumption for the air-conditioning and improves the comfort for the occupant in the cabin.

The scheduled ride time T1 as the scheduled pickup information is calculated based on the pickup time information and the present time. The start of the advanced air-conditioning is determined by comparing the scheduled ride time T1 and the scheduled air-conditioning time T2. This allows the advanced air-conditioning to be started at the proper timing before the pickup time. This reduces the energy consumption for the air-conditioning and improves the comfort for the occupant in the cabin.

When the scheduled air-conditioning time T2 is longer than the scheduled ride time T1, the air-conditioning is performed in the early air-conditioning mode. This reduces discomfort caused by the incompletion of the air-conditioning before the occupant getting on the vehicle.

Second Embodiment

The second embodiment is a modification of the preceding embodiment. In this embodiment, a motor 332 is used as a driving force in place of the engine 31. The air-conditioning device 1 is mounted in a vehicle using the motor 332 as a driving force such as electric vehicle.

Figure 4:
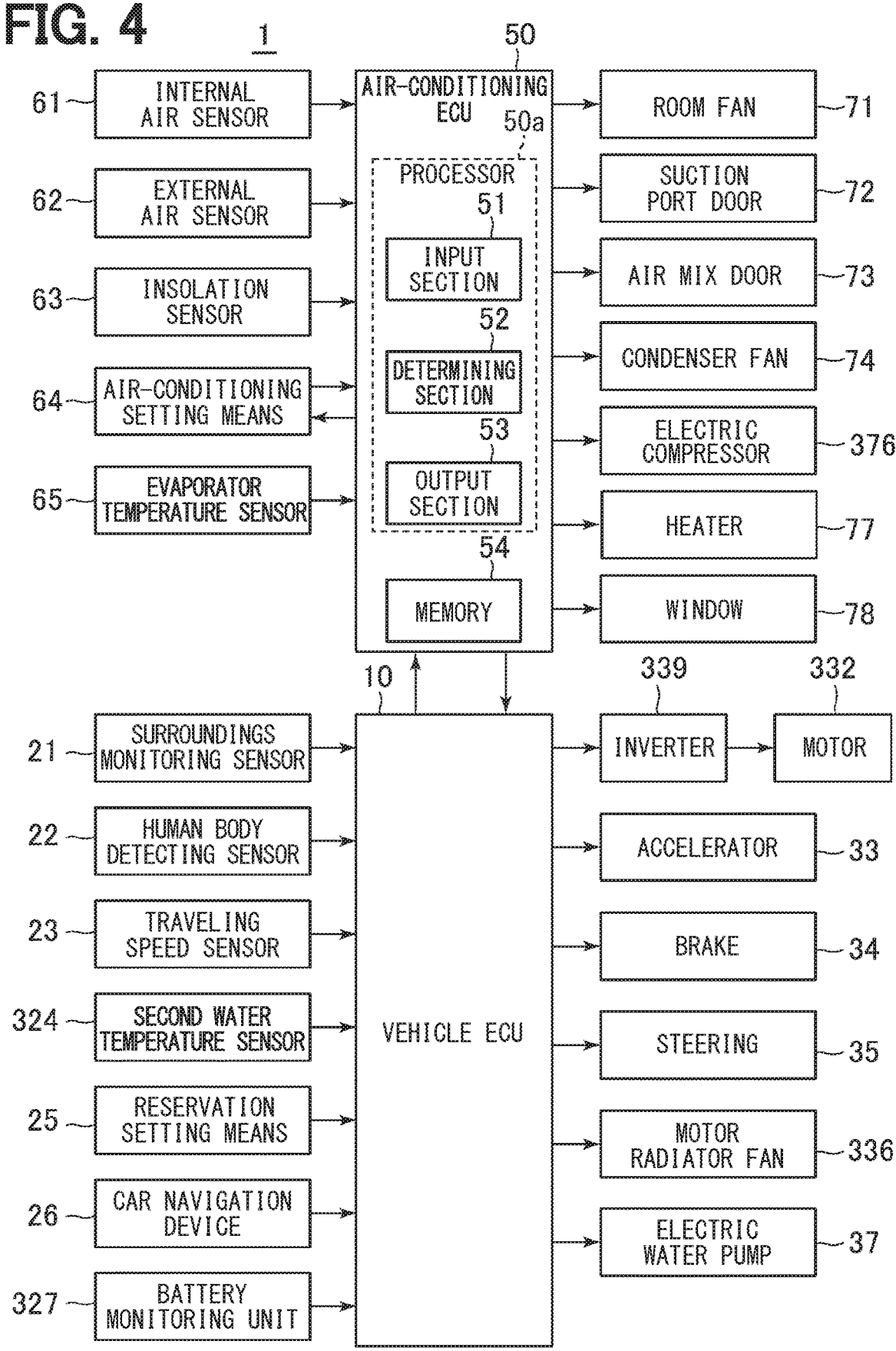
FIG. 4 is a block diagram of an air-conditioning device for the vehicle in accordance with the second embodiment.

In FIG. 4, the vehicle ECU 10 connects a second water temperature sensor 324 in place of the first water temperature sensor 24. The second water temperature sensor 324 is a temperature sensor disposed in a circulation path of cooling water that cools a heat generating components such as the motor 332, an inverter 339, and a battery. The second water temperature sensor 324 detects an increased temperature of the cooling water having just exchanged heat with the motor 332.

The vehicle ECU 10 connects a battery monitoring unit 327. The battery monitoring unit 327 is a unit to monitor the battery that supplies electric power with an electric component such as the motor 332. The battery monitoring unit 327 detects an amount of electricity stored in the battery. The vehicle ECU 10 takes the electricity from the battery during acceleration and drives the motor 332. The vehicle ECU 10 generates the electricity at the motor 332 during deceleration and stores the electricity in the battery.

The vehicle ECU 10 is connected to the motor 332 through the inverter 339 in place of the engine 31. The inverter 339 is a device to convert direction current to alternating current. The motor 332 is a driving force for the vehicle. The motor 332 converts electrical energy into mechanical energy.

The vehicle ECU 10 is connected to a motor radiator fan 336 in place of the engine radiator fan 36. The motor radiator fan 336 is a blower to blow air to a motor radiator. The motor radiator is a radiator thorough which cooling water that cools the motor 332 circulates. The motor radiator fan 336 is disposed in front of the motor radiator that is disposed in the front side of the vehicle. In other words, the motor radiator fan 336 is disposed to face the motor radiator. The motor radiator fan 336 blows air from the front side to the rear side of the vehicle. In other words, the motor radiator fan 336 blows air in the same direction as a traveling air that the vehicle receives while traveling.

The air-conditioning ECU 50 is connected to an electric compressor 376 in place of the clutch 75. The electric compressor 376 is a compressor constituting the cooling refrigerating cycle. The air-conditioning ECU 50 controls the electric compressor 376 in output as well as on-off of the electric compressor 376. The electric compressor is driven independently from the motor 332. The driving force for the vehicle is not used to control the air-conditioning. When the air-cooling is performed, the electric compressor 376 is driven and the evaporator is supplied with the refrigerant.

Figure 5:
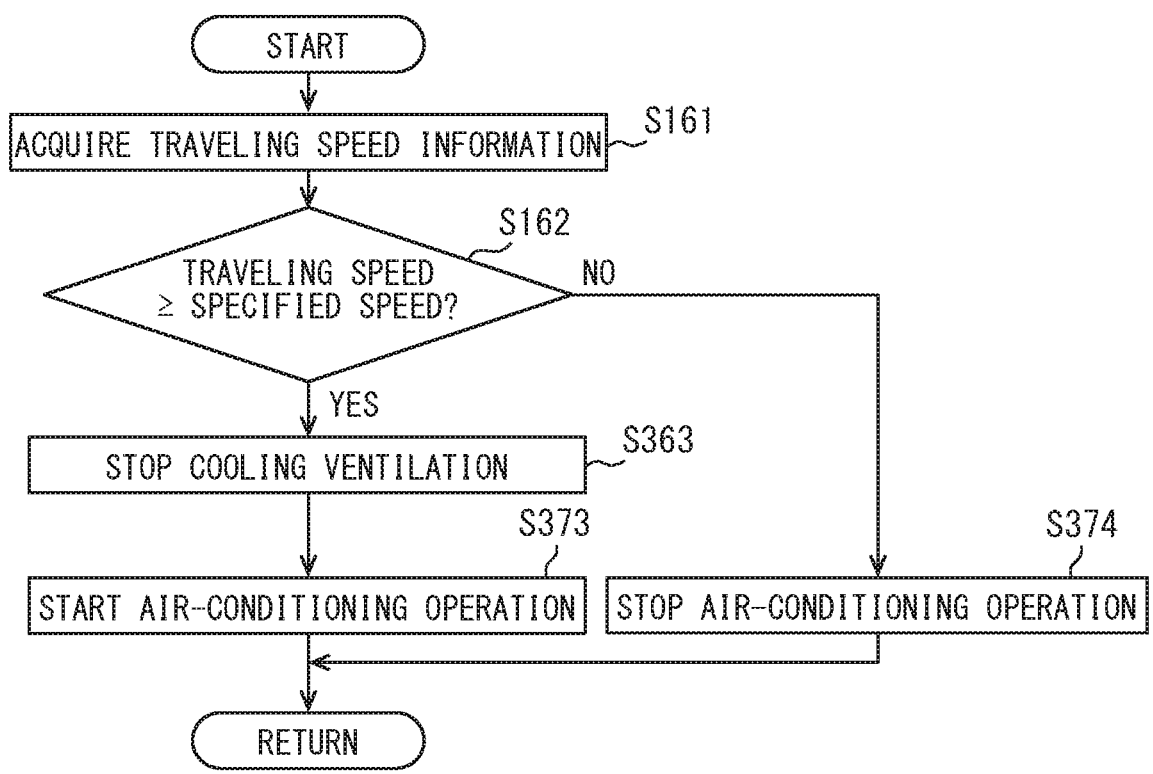
FIG. 5 is a flowchart in controlling the air-conditioning device in the second embodiment.

In FIG. 5, step having the same number with step in the preceding embodiment is the same process in the preceding embodiment and gives the same effect. The different point from the preceding embodiment is explained.

At step S162 in the energy saving air-conditioning mode, the processor 50a determines whether the traveling speed is equal to or greater than the specified speed. The specified speed is, for example, 30 km/h. When the processor 50a determines that the traveling speed is equal to or greater than the specified speed, the control process proceeds to step S363. When the processor 50a determines that the traveling speed is less than the specified speed, the control process proceeds to step S374. When the vehicle is stopped, the traveling speed is less than the specified speed.

At step S363, cooling ventilation is stopped. In other words, the motor radiator fan 336 and the condenser fan 74 are stopped. The motor radiator and the condenser are cooled only by traveling air. The fans may be driven at a lower rotational speed to reduce energy consumption, instead of stopping to convey air at step S363. After the stop of the fans, the control process proceeds to step S373.

At step S373, the air-conditioning is started. More specifically, the room fan 71 is driven at the higher rotational speed in the energy saving air-conditioning mode than in the manned air-conditioning mode. The electric compressor 373 is driven or the heater 77 is energized. The air is conditioned to the target temperature by controlling the opening degree of the air mix door 73 appropriately and mixing the cool air and the warm air. The control process returns back to the start of the energy saving air-conditioning mode while keeping the air-conditioning and repeats the series of the air-conditioning control.

At step S374, the air-conditioning is stopped temporarily. In the air-conditioning stop state, the room fan 71, energization of the electric compressor 376, and the heater 77 are stopped. The air-conditioning stop state is a state where all devices for the air-conditioning reduce energy consumption. The energy consumption may be reduced only in a specified device, not all of the devices for the air-conditioning. The electric compressor 376 and the heater 77 that are used for controlling a temperature may be stopped while other devices are kept working. The control process returns back to the start of the energy saving air-conditioning mode while keeping the air-conditioning stop state and repeats the series of the air-conditioning control.

According to the above mentioned embodiment, the air-conditioning is not performed in advance of the manned traveling when the vehicle is stopped without occupants. The traveling air cools the heat generating components, so that energy consumption in the motor radiator fan 336 and the condenser fan 74 is reduced.

The processor 50a performs the air-conditioning including the temperature adjusting when the processor 50a determines that the traveling speed is equal to or greater than the specified speed. The air-conditioning including the temperature adjusting, which consumes much energy, is performed at the timing when the vehicle receives large amount of traveling air. The energy consumption for driving the motor radiator fan 336 and the condenser fan 74 is reduced, and thus the vehicle performs an efficient air-conditioning.

Other Embodiments

The disclosure in this description is not necessarily limited to the embodiment described above. The disclosure includes the above mentioned embodiments and modifications based on the embodiments. For example, the disclosure is not limited to a combination of a member and/or a component described in the embodiments. The disclosure is achieved in various combinations. The disclosure can include an additional part that can be added appropriately to the embodiments. The disclosure includes omission of the member and/or the component in the embodiments. The disclosure includes a replacement and a combination between one embodiment and other embodiment. The technical range of the disclosure is not limited to the description of the embodiments. It should be appreciated that some of the technical features in the disclosure is described in the claims and includes all alternation in a range of the description in the claims and the equivalence.

The vehicle having the engine and the vehicle having the motor are taken as the examples, but the air-conditioning device 1 may be also applied to a vehicle having both of the engine and the motor as a driving force, such as hybrid vehicle.

What is claimed is:

1. An air-conditioning control apparatus mounted in a vehicle that is capable of unmanned traveling, the apparatus comprising:
   a determining section that is configured to determine whether an occupant is in the vehicle and whether the vehicle is traveling at a traveling speed equal to or greater than a specified speed; and
   an output section that is configured to perform, based on a determination result by the determining section, an air-conditioning control including temperature adjusting using a radiator through heat exchange with air outside the vehicle, wherein
   the output section is further configured to:
      perform the air-conditioning control when the determination result indicates the vehicle is in an unmanned state and the traveling speed of the vehicle is equal to or greater than the specified speed; and
      refrain from performing the air-conditioning control when the determination result indicates the vehicle is in the unmanned state and the traveling speed of the vehicle is less than the specified speed, and
   the specified speed is set such that the radiator is cooled by a traveling air of the vehicle generated when the vehicle is traveling at the specified speed or more.

2. The air-conditioning control apparatus according to claim 1, wherein
   the air-conditioning control controls an air-conditioning device that is configured to condition air using a driving force for the vehicle, and
   the output section is further configured to:
      perform the air-conditioning control when an efficiency of the driving force is equal to or higher than a specified efficiency; and
      refrain from performing the air-conditioning control when the efficiency of the driving force is lower than the specified efficiency.

3. The air-conditioning control apparatus according to claim 1, wherein
   the output section is further configured to perform an inside air mode where air in a cabin of the vehicle is recirculated when performing the air-conditioning control.

4. An air conditioning control apparatus mounted in a vehicle that is capable of unmanned traveling, the apparatus comprising
   a processor programmed to:
      determine whether an occupant is in the vehicle and whether the vehicle is traveling at a traveling speed equal to or greater than a specified speed;
      perform an air-conditioning control including temperature adjusting using a radiator through heat exchange with air outside the vehicle upon determining that the occupant is not in the vehicle and the vehicle is traveling at the traveling speed equal to or greater than the specified speed; and
      refrain from performing the air-conditioning control upon determining that the occupant is not in the vehicle and the vehicle is traveling at the traveling speed less than the specified speed, and
   the specified speed is set such that the radiator is cooled by a traveling air of the vehicle generated when the vehicle is traveling at the specified speed or more.

5. The air-conditioning control apparatus according to claim 4, wherein
   the air-conditioning control controls an air-conditioning device that is configured to condition air using a driving force for the vehicle, and
   the processor is further programmed to:
      determine whether an efficiency of the driving force is equal to or higher than a specified efficiency;
      perform the air-conditioning control upon determining that the occupant is not in the vehicle and the efficiency of the driving force is equal to or higher than the specified efficiency; and
      refrain from stopping the air-conditioning control upon determining that the occupant is not in the vehicle and the efficiency of the driving force is lower than the specified efficiency.

6. The air-conditioning control apparatus according to claim 5, wherein
   the processor is further programmed to determine that the efficiency of the driving force is equal to or higher than the specified efficiency when a rotational speed of an engine of the vehicle falls within a specified range.

7. The air-conditioning control apparatus according to claim 5, wherein
   the processor is further programmed to determine that the efficiency of the driving force is equal to or higher than the specified efficiency when a cooling water for an engine of the vehicle is at a temperature equal to or higher than a specified temperature.

8. The air-conditioning control apparatus according to claim 4, wherein
   the processor is further programmed to perform an inside air mode where air in a cabin of the vehicle is recirculated when performing the air-conditioning control.

9. An air-conditioning system for a vehicle that is capable of unmanned traveling, the system comprising:
   an air-conditioning device that is configured to perform air-conditioning in a cabin of the vehicle using a radiator that performs heat exchange with an air outside of the vehicle and a radiator fan that is configured to cool the radiator by drawing the air outside of the vehicle; and a processor that is programmed to:
   determine whether an occupant is in the vehicle and whether the vehicle is traveling at a traveling speed equal to or greater than a specified speed;
   control the air-conditioning device to perform the air-conditioning and the radiator fan to stop upon determining that the occupant is not in the vehicle and the vehicle is traveling at the traveling speed equal to or greater than the specified speed; and
   control the air-conditioning device not to perform the air-conditioning and the radiator fan to stop upon determining that the occupant is not in the vehicle and the vehicle is traveling at the traveling speed less than the specified speed, and the specified speed is set such that the radiator is cooled by a traveling air of the vehicle generated when the vehicle is traveling at the specified speed or more.

10. The air-conditioning control apparatus according to claim 6, wherein
   a ratio of an output energy to an input energy in the engine has a highest value when the engine operates at a most efficient rotational speed, and
   the specified range is set to include the most efficient rotational speed of the engine.

11. The air-conditioning control apparatus according to claim 7, wherein
   a heating completed temperature is defined as a temperature at which a heating for the engine is deemed to be completed, and
   the specified temperature is set to be the heating completed temperature.

* * * * *